(12) United States Patent
Sankoh et al.

(10) Patent No.: US 8,363,941 B2
(45) Date of Patent: Jan. 29, 2013

(54) METHOD AND PROGRAM FOR EXTRACTING SILHOUETTE IMAGE AND METHOD AND PROGRAM FOR CONSTRUCTING THREE DIMENSIONAL MODEL

(75) Inventors: Hiroshi Sankoh, Saitama (JP); Mehrdad Panahpour Tehrani, Saitama (JP); Sei Naito, Saitama (JP)

(73) Assignee: KDDI Corporation, Tokyo (JP)

( * ) Notice: Subject to any disclaimer, the term of this patent is extended or adjusted under 35 U.S.C. 154(b) by 476 days.

(21) Appl. No.: 12/630,497

(22) Filed: Dec. 3, 2009

(65) Prior Publication Data
US 2010/0166296 A1    Jul. 1, 2010

(30) Foreign Application Priority Data

Dec. 26, 2008   (JP) .................................. 2008-331762

(51) Int. Cl.
*G06K 9/34* (2006.01)
(52) U.S. Cl. ....................................... 382/174
(58) Field of Classification Search .................. None
See application file for complete search history.

(56) References Cited

U.S. PATENT DOCUMENTS

| | | | | |
|---|---|---|---|---|
| 6,256,036 B1 * | 7/2001 | Matsumoto | .................... | 345/419 |
| 6,363,169 B1 * | 3/2002 | Ritter et al. | .................... | 382/154 |
| 6,434,277 B1 * | 8/2002 | Yamada et al. | ............... | 382/285 |
| 6,529,206 B1 * | 3/2003 | Ohki et al. | .................... | 345/619 |
| 6,674,430 B1 * | 1/2004 | Kaufman et al. | ............. | 345/419 |
| 6,778,172 B2 * | 8/2004 | Harada et al. | ................. | 345/419 |
| 7,016,527 B2 | 3/2006 | Fujiwara | | |
| 7,209,136 B2 * | 4/2007 | Grau | .............................. | 345/419 |
| 7,295,698 B2 * | 11/2007 | Miyoshi et al. | ............... | 382/154 |
| 7,760,932 B2 * | 7/2010 | Lee et al. | ........................ | 382/154 |
| 8,059,153 B1 * | 11/2011 | Barreto et al. | ................ | 348/169 |
| 2005/0052452 A1 * | 3/2005 | Baumberg | .................... | 345/419 |

FOREIGN PATENT DOCUMENTS

| | | |
|---|---|---|
| JP | A-2002-236909 | 8/2002 |
| JP | A-2003-067725 | 3/2003 |
| JP | A-2005-278690 | 10/2005 |
| JP | A-2007-17364 | 1/2007 |

OTHER PUBLICATIONS

M. Toyoura, M. Iiyama, K. Kakusho, and M. Minoh. Silhouette extraction with random pattern backgrounds for the volume intersection method. In the 6th International Conference on 3-D Digital Imaging and Modeling (3DIM 2007), pp. 225-232, Aug. 2007.*
Toyoura et al., "Silhouette Refinement for Visual Hull with Random Pattern Background," IEICE General Conference, 2005, D-12-133, pp. 283.
Japanese Patent Office, Notice of Reasons for Rejection mailed Jul. 10, 2012 in Japanese Patent Application No. 2008-331762.

* cited by examiner

*Primary Examiner* — Samir Ahmed
(74) *Attorney, Agent, or Firm* — Oliff & Berridge, PLC

(57) ABSTRACT

A present invention provides a method and a program for extracting the high accuracy silhouette by relatively simple process not using manual labor or special photography environment. A method for extracting the high accuracy silhouette comprises: extracting a number of first silhouettes from a number of object images and a number of background images by a background subtraction; constructing first visual hull from a number of the first silhouettes by a shape from silhouette method; constructing second visual hull by process to repair missed parts and/or to remove unwanted regions in first visual hull; and extracting a number of second silhouettes from the second visual hull.

7 Claims, 12 Drawing Sheets

METHOD AND PROGRAM FOR EXTRACTING SILHOUETTE IMAGE AND METHOD AND PROGRAM FOR CONSTRUCTING THREE DIMENSIONAL MODEL

PRIORITY CLAIM

This application claims priority from Japanese patent application No. 2008-331762, filed on Dec. 26, 2008, which is incorporated herein by reference.

BACKGROUND OF THE INVENTION

1. Field of the Invention

The present invention relates to a method and a program for extracting a silhouette image, and a method and a program for constructing 3D voxel model (visual hull). More specifically, the present invention relates to a background subtraction method and a program for extracting the silhouette from an image which an object is captured and an image which only a background is captured, and a 3D modeling method and a program for constructing the visual hull from a number of the silhouettes extracted by the above by applying a shape from silhouette method.

2. Description of the Related Art

Heretofore, a background subtraction which extracts the silhouette representing the object from the image which the object is captured and a 3D modeling which constructs visual hull from a number of the make images by applying the shape from silhouette method are performed separately. For this reason, in order to construct high accuracy visual hull, it was necessary to extract a high accuracy silhouette and special environment such as a blue back was necessary. Japanese patent publication No. 2007-17364 and Toyoura et al "Silhouette Refinement for Visual Hull with Random Pattern Background", the 2005 IEICE General Conference, D-12-133 describe a method for improving accuracy of the silhouette, the method repairs a missed part of the silhouette exercising ingenuity in a background subtraction and using color information of the visual hull.

BRIEF SUMMARY OF THE INVENTION

A conventional method needed firstly a sufficiently high accuracy silhouette in order to construct high accuracy visual hull. Therefore, there was a problem to have to extract the high accuracy silhouette with complicatedly calculating and using manual labor or special photography environment such as the blue back.

Therefore, it is an object of a present invention to provide a method and a program for extracting the high accuracy silhouette by relatively simple process not using manual labor or special photography environment, and a method and a program for constructing visual hull from said silhouette.

To realize the above object, according to a method for extracting a number of silhouettes of the present invention, a method for extracting a number of silhouettes representing the object from a number of object images which an object and a background are captured and a number of background images which only a background is captured comprises: a first extract step of extracting a number of first silhouettes from a number of said object images and a number of said background images by a background subtraction; a first construct step of constructing first visual hull from a number of said first silhouettes by a shape from silhouette method; a second construct step of constructing second visual hull by process to repair missed parts and/or to remove unwanted regions in first visual hull; and a second extract step of extracting a number of second silhouettes from said second visual hull.

Further, it is also preferable that said second extract step from said first construct step are repeated with assuming a number of said second silhouettes to be a number of said first silhouettes at said first construct step.

Further, it is also preferable that said second construct step comprises: a sub step of acquiring a number of first slice images of said first visual hull from an x-axis, a y-axis and a z-axis direction; and a sub step of performing a filter process to a number of said first slice images and constructing second visual hull according to a result of said filter process.

Further, it is also preferable that said sub step of constructing second visual hull is a step of constructing said second visual hull by performing a filter process to a number of said first slice images, by searching pixels became white by the filter process, and by repairing three dimensional coordinates of said first visual hull corresponding to said pixels.

Further, it is also preferable that said second extract step comprises: a sub step of performing a filter process to a number of said first slice images, searching pixels became white by the filter process, projective-transforming said pixels into the silhouettes, and extracting a number of third silhouettes; a sub step of acquiring a number of second slice images of said second visual hull from the y-axis direction; a sub step of extracting a number of fourth silhouettes, by searching white pixels of a number of said second slice images, and by projective-transforming said pixels into the silhouettes; and a sub step of extracting a number of second silhouettes by performing a filter process to a number of said fourth silhouettes, by making white of pixels that both of a number of said fourth silhouettes performed the filter process and a number of said third silhouettes are white, and by making black of other pixels.

Further, it is also preferable that said method for extracting a number of silhouettes further comprises a step of performing a filter process to a number of said second silhouettes after said second extract step.

To realize the above object, according to a program for extracting a number of silhouettes of the present invention, a program for extracting a number of silhouettes representing the object from a number of object images which an object and a background are captured and a number of background images which only a background is captured comprises: a first extract means for extracting a number of first silhouettes from a number of said object images and a number of said background images by a background subtraction; a first construct means for constructing first visual hull from a number of said first silhouettes by a shape from silhouette method; a second construct means for constructing second visual hull by process to repair missed parts and/or to remove unwanted regions in first visual hull; and a second extract means for extracting a number of second silhouettes from said second visual hull.

To realize the above object, according to a method for constructing visual hull of the present invention, a method for constructing visual hull from a number of object images which an object and a background are captured and a number of background images which only a background is captured comprises: a first extract step of extracting a number of first silhouettes from a number of said object images and a number of said background images by a background subtraction; a first construct step of constructing first visual hull from a number of said first silhouettes by a shape from silhouette method; a second construct step of constructing second visual hull by process to repair missed parts and/or to remove unwanted regions in first visual hull; a second extract step of extracting a number of second silhouettes from said second visual hull; and a third construct step of constructing third visual hull from a number of said second silhouettes by the shape from silhouette method.

To realize the above object, according to a program for constructing visual hull of the present invention, a program for constructing visual hull from a number of object images which an object and a background are captured and a number of background images which only a background is captured comprises: a first extract means for extracting a number of first silhouettes from a number of said object images and a number of said background images by a background subtraction; a first construct means for constructing first visual hull from a number of said first silhouettes by a shape from silhouette method; a second construct means for constructing second visual hull by process to repair missed parts and/or to remove unwanted regions in first visual hull; a second extract means for extracting a number of second silhouettes from said second visual hull; and a third construct means for constructing third visual hull from a number of said second silhouettes by the shape from silhouette method.

According to the present invention, the method and the program for extracting the silhouettes perform the improvement of the accuracy of the silhouette and the visual hull with interpolation by reflecting the information of visual hull to the silhouette. The method and the program does not need firstly the sufficiently high accuracy silhouette, and can extract the high accuracy silhouette without complicatedly calculating, and can construct the high accuracy visual hull from the high accuracy silhouette. Further, the present invention does not rely on the special photography environment and can apply general images.

DETAILED DESCRIPTION OF THE INVENTION

Figure 1:
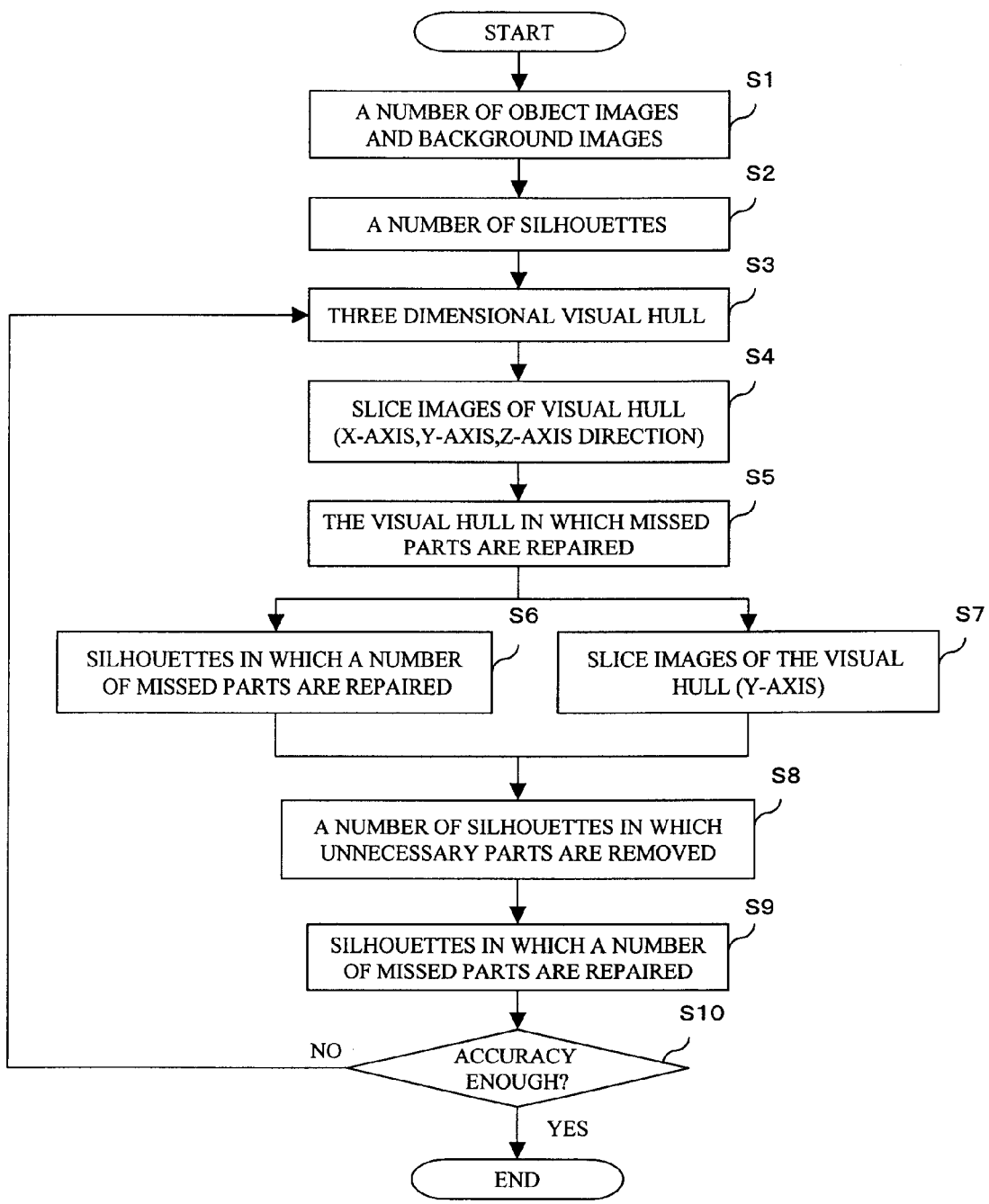
FIG. 1 shows a flow chart showing a method for extracting the silhouette and a method for constructing visual hull according to the present invention.

An embodiment of a method and a program for extracting a silhouette and a method and a program for constructing visual hull according to the present invention will be described below with reference to the drawings. FIG. 1 shows a flow chart showing a method for extracting the silhouette and a method for constructing visual hull according to the present invention. The embodiment will be described below with reference to the flow chart.

Step 1: A number of object images and background images placed in a circle are obtained. A number of calibrated cameras are placed in the circle, and the object images including the object and the background and the background images only including the background are captured with said cameras, and then the object images and the background images captured from a number of different directions are obtained. For example, when 30 cameras are placed, the object images and the background images are obtained 30 pieces, respectively.

Step 2: A number of silhouettes are extracted from said object images and said background images by a background subtraction. Since these silhouettes are obtained by the simple conventional background subtraction, the accuracy of these silhouettes is not high. The silhouettes are extracted for the number of the camera. For example, when 30 cameras are placed, 30 pieces of silhouettes are extracted.

Step 3: Visual hull are construct by applying a shape from silhouette method. Since the accuracy of the visual hull depends on the accuracy of the silhouettes, when the silhouettes extracted by the step 2 are used, the accuracy of the constructed visual hull is not high.

Step 4: Slice images of the above visual hull are acquired. Considering that visual hull is the collection of the slice images from a certain direction, the slice images of the visual hull are acquired from an x-axis, a y-axis and a z-axis direction. The slice images get the number of sheets of the coordinate range with each axis. For example, when the y-axis coordinate range of the visual hull is $-256$ $-255$, 512 pieces of slice images are acquired. Note that, the y-axis is vertical direction, and the x-axis and the z-axis are horizontal directions, respectively.

Step 5: The visual hull in which missed parts are repaired are constructed. Since there may be a case that the slice images of step 4 are acquired from the visual hull which is not high accuracy, they may include missed parts in which a white point representing the object region is misclassified as black representing background or unwanted regions in which white is misclassified as black. Therefore, a filter process is performed to the acquired slice images from each direction (the x-axis, the y-axis, the z-axis). For example, some of missed parts are repaired by applying a gauss filter, and the unwanted regions in the visual hull are removed by applying a median filter. In this way, the filtered slice images are obtained. Next, the filtered slice images are compared with the no filtered slice images, and pixels that became the white newly (i.e. the pixels that were repaired by the filter process) are searched, and then the three dimensional coordinates of the visual hull corresponding to these pixels are repaired. For example, when the pixel that became the white is y-coordinate y1, z-coordinate z1 in the slice image acquired in coordinate x1 of the x-axis, the three dimensional coordinate (x1, y1, z1) of visual hull is repaired. The above-mentioned process is performed to all slice images, and the visual hull that the missed parts are repaired is acquired.

Step 6: The silhouettes in which a number of missed parts are repaired are extracted. The three dimensional coordinates of the step 5 are projective-transformed into each silhouette, and the corresponding pixels in each silhouette become white. In other words, the three dimensional coordinate of the slice image is projective-transformed, and an image watched from the position where each silhouette is captured is made, and the pixels corresponding to the three dimensional coordinate of the step 5 in the said image become white. Thereby, the silhouettes in which the missed parts are repaired are extracted.

Step 7: Slice images of the visual hull acquired by the above step 5 are acquired from the y-axis direction. The slice images get the number of sheets of the coordinate range with each axis as well as the step 4.

Step 8: A number of silhouettes in which unnecessary parts are removed are extracted. The three dimensional coordinates corresponding the white pixels of the slice images from the y-axis direction acquired by the step 7 are projective-transformed into the each silhouette, and the corresponding pixels in each silhouette become white. A filter process is performed to the silhouettes obtained above. The silhouettes obtained above are compared with the silhouettes extracted by the step 6, pixels that both images are white make white, and other pixels make black. The above-mentioned process is performed to all silhouettes, and the silhouettes in which the unnecessary parts are removed are extracted.

Step 9: The silhouettes in which a number of missed parts are repaired are extracted. A filter process is performed to the silhouettes obtained above, so that the missed parts are further repaired. Thus, the missed parts are repaired (step 6), and the unnecessary parts are deleted (step 8), and the missed parts are repaired (step 9), the higher accuracy silhouettes are extracted by these process.

Step 10: If the accuracy of the silhouettes are enough, high accuracy visual hull are constructed by the shape from silhouette method from these silhouettes. If the accuracy of the silhouettes are not enough, with assuming the silhouettes obtained by the step 9 to be an input of the step 3, the step 9 from the step 3 are repeated, the accuracy of the silhouettes and the visual hull are gradually updated.

Generally, when the shape from silhouette method is used, the unnecessary parts such as shadows in the silhouettes do not affect the generation of the visual hull too much. However, the missed parts in a person mask affect the generation of the visual hull too much. It is necessary to repair the missed parts in the person mask.

Also, the pixels that there is a person in the slice image of visual hull (i.e., the pixels of the white rather than the black) surely become the white in the corresponding pixels of each silhouette. However, the pixels that there is not a target object (the black pixels) may not be necessarily black in each silhouette.

Therefore, the pixels of the white in the slice images are important, and the improvement of the accuracy of the slice images will repair in the missed parts little by little. The accuracy of the slice images improves, and the missed parts of the visual hull are repaired little by little by repeating the step 9 from the step 3.

Figure 2:
FIG. 2 shows an example of a silhouette obtained from the camera image.

Next, the improvement of the silhouettes is shown by real images. FIG. 2 shows an example of a silhouette obtained from the camera image. FIG. 2 is a silhouette generated by the step 2 by the simple background subtraction, and it is found that the accuracy is not high.

Figure 3A:
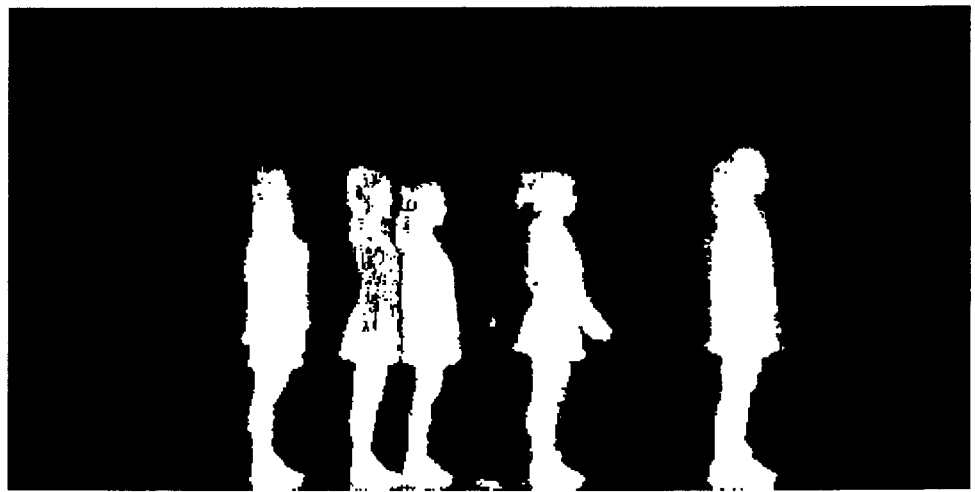
FIGS. 3a to 3c show an example of visual hull constructed from the silhouette of FIG. 2.
Figure 3B:
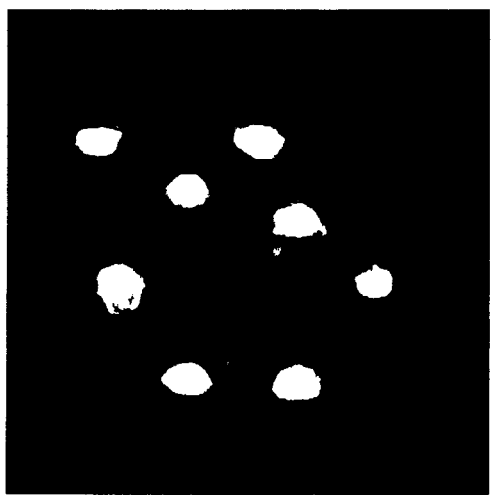
Figure 3C:

FIGS. 3a to 3c show an example of visual hull constructed from the silhouette of FIG. 2. Since the visual hull are three dimensions, an image (a) watched from the horizontal direction (the x-axis direction), an image (b) watched from the vertical direction (the y-axis direction), and an image (c) watched from the horizontal direction (the z-axis direction) are shown. Note that, FIG. 3b is reduced 50% in comparison with FIG. 3a and FIG. 3c. Since these visual hull are constructed by the silhouette of FIG. 2 which is not high accuracy, the accuracy is not high. The pixels which should be white are not repaired and are black, and originally black pixels are white.

Figure 4A:
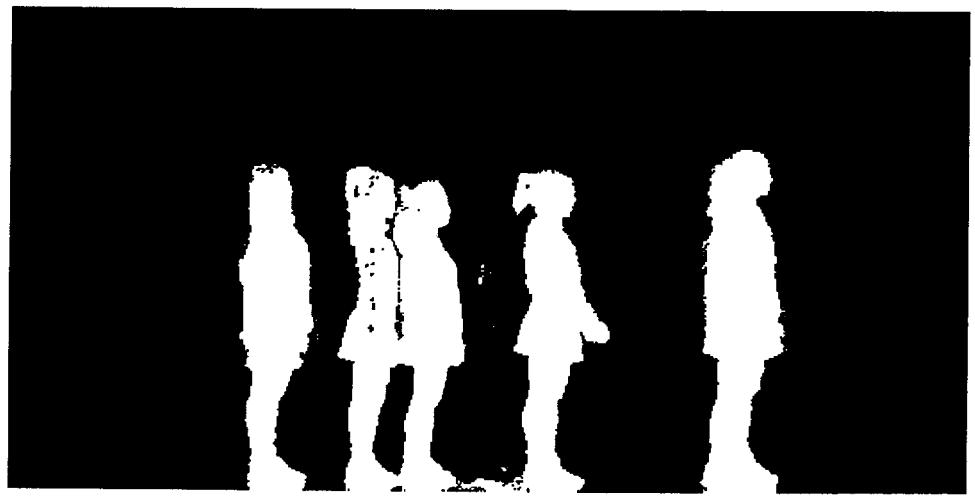
FIGS. 4a to 4c show an example of visual hull that missed parts of the visual hull of FIG. 3 are repaired.
Figure 4B:
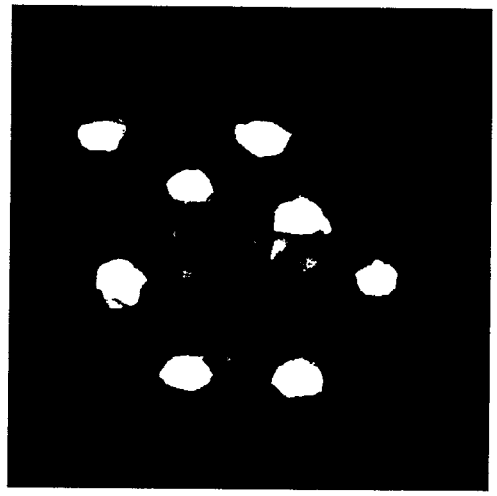
Figure 4C:
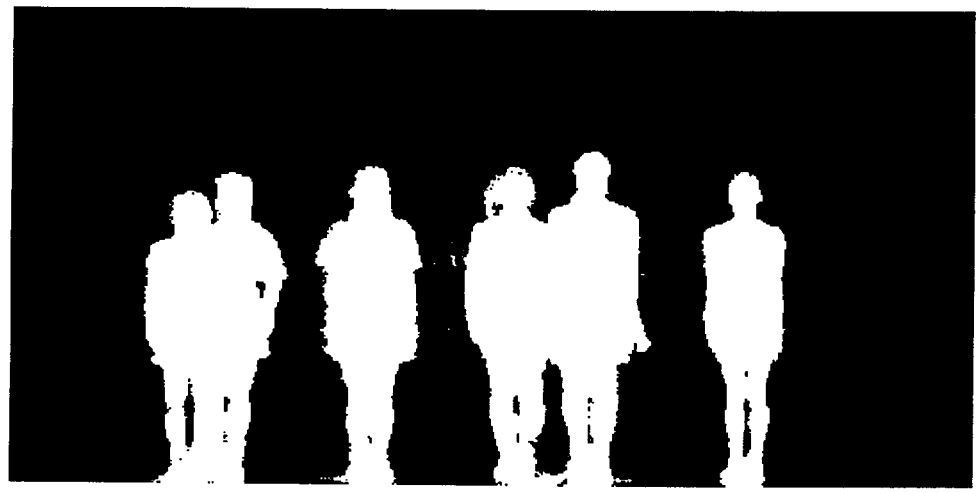

FIGS. 4a to 4c show an example of visual hull that missed parts of the visual hull of FIG. 3 are repaired. It is the visual hull after having repaired the missed parts of the visual hull of FIG. 3 by the step 5. These figures also show an image (a) watched from the x-axis direction, an image (b) watched from the y-axis direction, and an image (c) watched from the z-axis direction, and FIG. 4b is reduced 50% in comparison with FIG. 4a and FIG. 4c. When FIG. 4 compares with FIG. 3, for example, it is found that missed parts in the second person from the left of the x-axis direction are repaired.

Figure 5:
FIG. 5 shows a silhouette that missed parts of the silhouette of FIG. 2 are repaired.

FIG. 5 shows a silhouette that missed parts of the silhouette of FIG. 2 are repaired. It is the silhouette that the process of the step 5 and the step 6 are performed. When FIG. 5 compares with FIG. 2, missed parts in the part of the person are repaired. In other words, it is found that a black pixel becomes the white.

Figure 6:
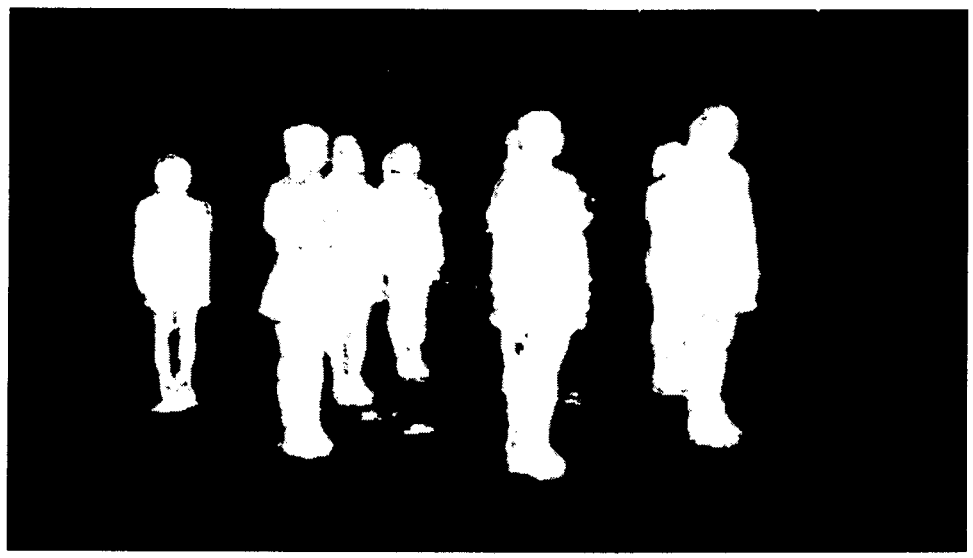
FIG. 6 shows a silhouette that unnecessary parts of the silhouette of FIG. 5 are removed.

FIG. 6 shows a silhouette that unnecessary parts of the silhouette of FIG. 5 are removed. It is the silhouette that the process of the step 8 is performed. When FIG. 6 compares with FIG. 5, it is found that the unnecessary parts are removed. Note that, since the silhouette of FIG. 6 extracts white parts with both of the slice image extracted from the y-axis direction of the step 7 and the silhouette of FIG. 5, background parts of the silhouette of FIG. 6 are removed.

Figure 7:
FIG. 7 shows a silhouette that a filter process is performed to the silhouette of FIG. 6.

FIG. 7 shows a silhouette that a filter process is performed to the silhouette of FIG. 6. It is the silhouette that the process of the step 9 is performed. When FIG. 7 compares with FIG. 6, it is found that missed parts are further repaired by the filter process.

Note that, the silhouettes of FIG. 2, FIG. 5, FIG. 6, and FIG. 7 are one piece of a number of silhouettes, and the process was performed to the silhouettes for the number of the cameras.

When the silhouette of FIG. 2 compares with the silhouette of FIG. 7, it is found that the accuracy of silhouettes largely improves by performing the step 9 from the step 3 of the present invention once.

Figure 8:
FIG. 8 shows a silhouette extracted by performing the step 9 from the step 3 of the present invention three times.
Figure 9:
FIG. 9 shows a silhouette extracted by performing the step 9 from the step 3 of the present invention five times.
Figure 10:
FIG. 10 shows a silhouette extracted by performing the step 9 from the step 3 of the present invention seven times.
Figure 11:
FIG. 11 shows a silhouette extracted by performing the step 9 from the step 3 of the present invention nine times.

The accuracy of silhouettes can further improve by performing the step 9 from the step 3 of the present invention several times. FIG. 8 shows a silhouette extracted by performing the step 9 from the step 3 of the present invention three times. FIG. 9 shows a silhouette extracted by performing the step 9 from the step 3 of the present invention five times. FIG. 10 shows a silhouette extracted by performing the step 9 from the step 3 of the present invention seven times. FIG. 11 shows a silhouette extracted by performing the step 9 from the step 3 of the present invention nine times. When the silhouettes of FIG. 7, FIG. 8, FIG. 9, FIG. 10, and FIG. 11 compare with each other, it can be realized that the accuracy of the silhouettes little by little improves. For example, a point pointed out with an arrow 1 is originally a point which should be white in the people. When FIG. 8 compares with FIG. 7, it is found that a missed part becomes small at FIG. 8, and it is found that the missed part is completely repaired at FIG. 9, FIG. 10, and FIG. 11. Also, a point pointed out with an arrow 2 is originally a background point which should be black. When FIG. 7, FIG. 8, and FIG. 9 compare with each other, it is found that a point of the white becomes small, and it is found that the point of the white completely disappears at FIG. 10 and FIG. 11.

Figure 12A:
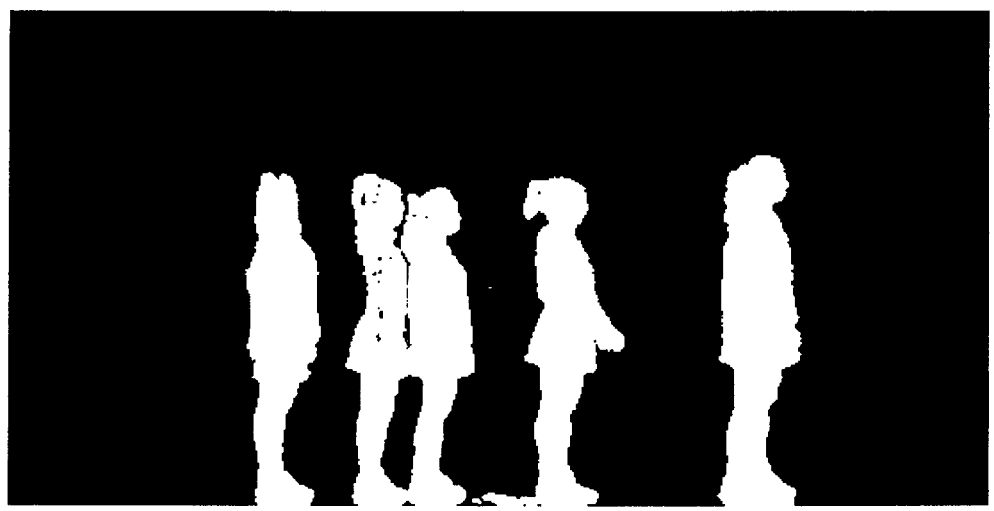
FIGS. 12a to 12c show visual hull constructed from the silhouette of FIG. 7.
Figure 12B:
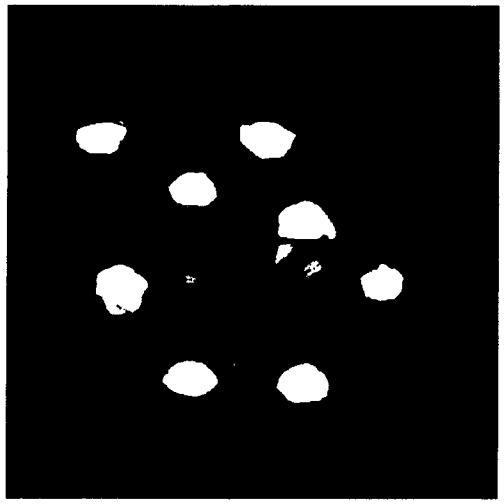
Figure 12C:
Figure 13A:
FIGS. 13a to 13c show visual hull constructed from the silhouette of FIG. 8.
Figure 13B:
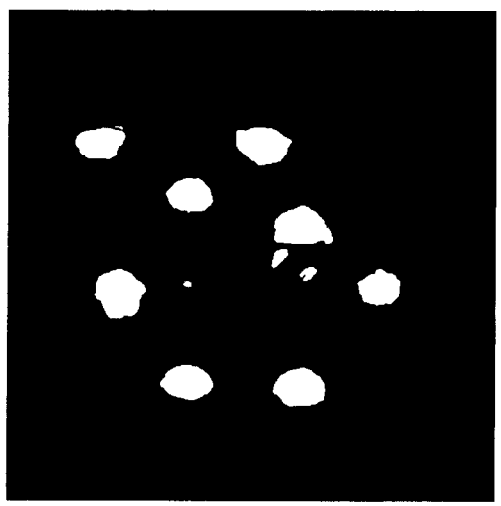
Figure 13C:
Figure 14A:
FIGS. 14a to 14c show visual hull constructed from the silhouette of FIG. 9.
Figure 14B:
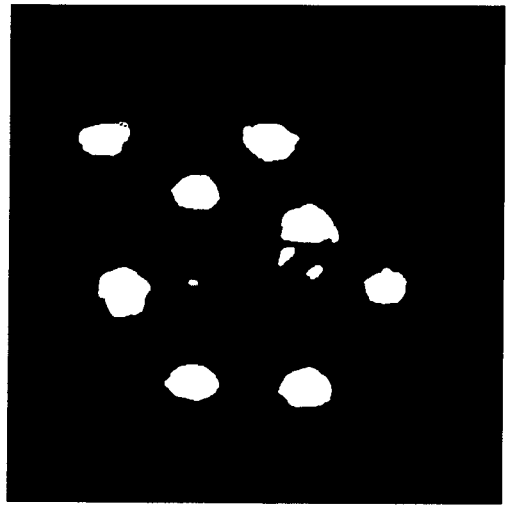
Figure 14C:
Figure 15A:
FIGS. 15a to 15c show visual hull constructed from the silhouette of FIG. 10.
Figure 15B:
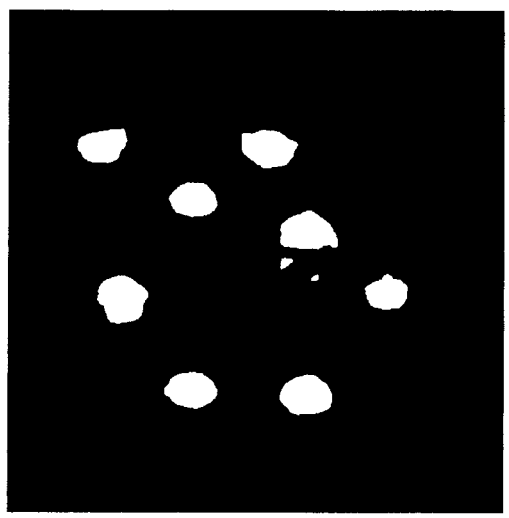
Figure 15C:
Figure 16A:
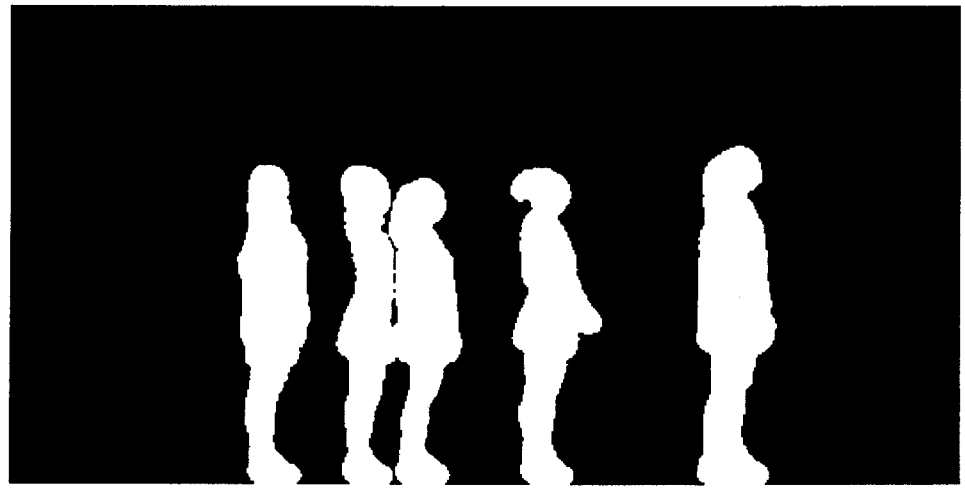
FIGS. 16a to 16c show visual hull constructed from the silhouette of FIG. 11.
Figure 16B:
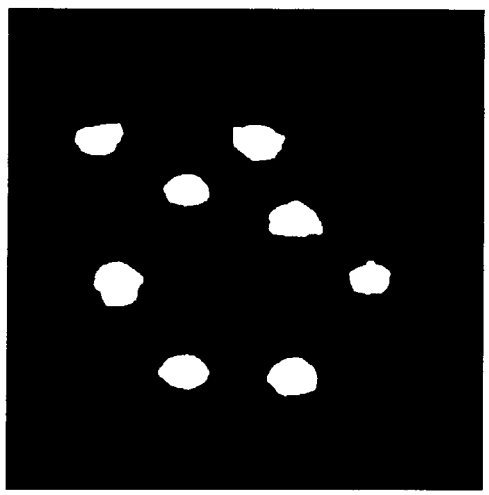
Figure 16C:

Finally, the visual hulls constructed from silhouettes of FIG. 7, FIG. 8, FIG. 9, FIG. 10, and FIG. 11 are shown. FIGS. 12a to 12c show visual hull constructed from the silhouette of FIG. 7, FIGS. 13a to 13c show visual hull constructed from the silhouette of FIG. 8, FIGS. 14a to 14c show visual hull constructed from the silhouette of FIG. 9, FIGS. 15a to 15c show visual hull constructed from the silhouette of FIG. 10, and FIGS. 16a to 16c show visual hull constructed from the silhouette of FIG. 11, respectively. These figures show an image (a) watched from the x-axis direction, an image (b) watched from the y-axis direction, and an image (c) watched from the z-axis direction, and the image (b) is reduced 50% in comparison with the image (a) and the image (c). It is found that the accuracy of the visual hull improves with improvement of the accuracy of the silhouettes, respectively. For example, in the second person from the left of the x-axis direction, it is found that a missed part gradually shrinks as it advances with FIG. 12, FIG. 13, and FIG. 14 and it is found that the missed part is completely repaired at FIG. 15 and FIG. 16. Also, it is found that a part below the foot of second person from the right (it is a background and should be black) gradually shrinks as it advances with FIG. 12, FIG. 13, FIG. 14, and FIG. 15, and it is found that it completely disappears at FIG. 16. In this way, it is found that the visual hull improved the accuracy are constructed from the silhouette improved the accuracy.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A method for extracting a number of silhouettes representing an object from a number of object images in which the object and a background are captured and a number of background images in which only the background is captured comprising:
   a first extract step of extracting a number of first silhouettes from the number of said object images and the number of said background images by a background subtraction;
   a first construct step of constructing a first visual hull from the number of said first silhouettes by a shape from silhouette method;
   a second construct step of constructing a second visual hull by a process to repair missed parts or to remove unwanted regions in said first visual hull; and
   a second extract step of extracting a number of second silhouettes from said second visual hull,
   wherein the steps are performed by a processor,
   said second construct step further including
   a sub step of acquiring a number of first slice images of said first visual hull from an x-axis, a y-axis and a z-axis direction; and
   a sub step of performing a filter process to the number of said first slice images and constructing said second visual hull according to a result of said filter process, and
   said sub step of constructing said second visual hull is a step of constructing said second visual hull by performing a filter process to the number of said first slice images, by searching for pixels that became white by the filter process, wherein white represents the object region, and black represents background, and by repairing three dimensional coordinates of said first visual hull corresponding to said pixels.

2. The method for extracting the number of silhouettes according to claim 1, wherein said second extract step from said first construct step are repeated with assuming the number of said second silhouettes to be the number of said first silhouettes at said first construct step.

3. The method for extracting the number of silhouettes according to claim 1, wherein said second extract step further comprises:
   a sub step of projective-transforming said pixels into the silhouettes, and extracting a number of third silhouettes;
   a sub step of acquiring a number of second slice images of said second visual hull from the y-axis direction;
   a sub step of extracting a number of fourth silhouettes, by searching white pixels of the number of said second slice images, and by projective-transforming said pixels into the silhouettes; and
   a sub step of extracting a number of second silhouettes by performing a filter process to the number of said fourth silhouettes, by making white of pixels that both of the number of said fourth silhouettes performed the filter process and the number of said third silhouettes are white, and by making black of other pixels.

4. The method for extracting the number of silhouettes according to claim 1, wherein said method for extracting the number of silhouettes further comprises a step of performing a filter process to the number of said second silhouettes after said second extract step.

5. A non-transitory computer readable medium storing a program for extracting a number of silhouettes representing an object from a number of object images in which the object and a background are captured and a number of background images in which only the background is captured, the program, when executed by a computer, causing the computer to perform a method comprising:
   extracting a number of first silhouettes from the number of said object images and the number of said background images by a background subtraction;
   constructing a first visual hull from the number of said first silhouettes by a shape from silhouette method;
   constructing a second visual hull by a process to repair missed parts or to remove unwanted regions in said first visual hull; and
   extracting a number of second silhouettes from said second visual hull,
   wherein said second construct means includes
   a sub means for acquiring a number of first slice images of said first visual hull from an x-axis, a y-axis and a z-axis direction; and
   a sub means for performing a filter process to the number of said first slice images and constructing said second visual hull according to a result of said filter process, and
   said sub means for constructing said second visual hull is a means for constructing said second visual hull by performing a filter process to the number of said first slice images, by searching for pixels that became white by the filter process, wherein white represents the object region, and black represents background, and by repairing three dimensional coordinates of said first visual hull corresponding to said pixels.

6. A method for constructing a visual hull from a number of object images in which an object and a background are captured and a number of background images in which only the background is captured comprising:

a first extract step of extracting a number of first silhouettes from the number of said object images and the number of said background images by a background subtraction;
a first construct step of constructing a first visual hull from the number of said first silhouettes by a shape from silhouette method;
a second construct step of constructing a second visual hull by a process to repair missed parts or to remove unwanted regions in said first visual hull;
a second extract step of extracting a number of second silhouettes from said second visual hull; and
a third construct step of constructing a third visual hull from the number of said second silhouettes by the shape from silhouette method,
wherein the steps are performed by a processor,
said second construct step includes
a sub step of acquiring a number of first slice images of said first visual hull from an x-axis, a y-axis and a z-axis direction; and
a sub step of performing a filter process to the number of said first slice images and constructing said second visual hull according to a result of said filter process, and
said sub step of constructing said second visual hull is a step of constructing said second visual hull by performing a filter process to the number of said first slice images, by searching for pixels that became white by the filter process, wherein white represents the object region, and black represents background, and by repairing three dimensional coordinates of said first visual hull corresponding to said pixels.

7. A non-transitory computer readable medium storing a program for constructing a visual hull from a number of object images in which an object and a background are captured and a number of background images which only the background is captured, the program, when executed by a computer, causing the computer to perform a method comprising:
  extracting a number of first silhouettes from the number of said object images and the number of said background images by a background subtraction;
  constructing a first visual hull from the number of said first silhouettes by a shape from silhouette method;
  constructing a second visual hull by a process to repair missed parts or to remove unwanted regions in said first visual hull;
  extracting a number of second silhouettes from said second visual hull;
  and
  constructing a third visual hull from the number of said second silhouettes by the shape from silhouette method,
  wherein said second construct means includes
  a sub means for acquiring a number of first slice images of said first visual hull from an x-axis, a y-axis and a z-axis direction; and
  a sub means for performing a filter process to the number of said first slice images and constructing said second visual hull according to a result of said filter process, and
  said sub means for constructing said second visual hull is a means for constructing said second visual hull by performing a filter process to the number of said first slice images, by searching for pixels that became white by the filter process, wherein white represents the object region, and black represents background, and by repairing three dimensional coordinates of said first visual hull corresponding to said pixels.

* * * * *